United States Patent
Smith et al.

(10) Patent No.: US 9,461,976 B1
(45) Date of Patent: Oct. 4, 2016

(54) GOAL-DRIVEN PROVISIONING IN IOT SYSTEMS

(71) Applicant: McAfee, Inc., Santa Clara, CA (US)

(72) Inventors: Ned Smith, Beaverton, OR (US); Sven Schrecker, Mission Viejo, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/717,754

(22) Filed: May 20, 2015

Related U.S. Application Data

(60) Provisional application No. 62/138,255, filed on Mar. 25, 2015.

(51) Int. Cl.
 *H04L 29/06* (2006.01)
 *G06F 15/16* (2006.01)
 *G06F 15/173* (2006.01)

(52) U.S. Cl.
 CPC ......... *H04L 63/062* (2013.01); *H04L 63/0876* (2013.01)

(58) Field of Classification Search
 None
 See application file for complete search history.

(56) References Cited

U.S. PATENT DOCUMENTS

| | | | | |
|---|---|---|---|---|
| 2004/0088065 | A1* | 5/2004 | Robitaille | G05B 19/41865 700/95 |
| 2014/0241354 | A1* | 8/2014 | Shuman | H04L 67/16 370/390 |
| 2014/0244568 | A1* | 8/2014 | Goel | H04W 4/005 706/52 |
| 2014/0244768 | A1* | 8/2014 | Shuman | H04L 51/32 709/206 |
| 2014/0324973 | A1* | 10/2014 | Goel | H04L 12/2803 709/204 |
| 2014/0359131 | A1* | 12/2014 | Seed | H04L 47/125 709/226 |
| 2016/0006815 | A1* | 1/2016 | Dong | G06F 9/46 709/204 |
| 2016/0105292 | A1* | 4/2016 | Choi | H04L 12/2818 709/206 |

* cited by examiner

*Primary Examiner* — Shin-Hon Chen
(74) *Attorney, Agent, or Firm* — Blank Rome, LLP

(57) ABSTRACT

Techniques are disclosed for provisioning Internet of Things (IoT) devices in accordance with a state machine model. More particularly, collections of IoT devices may be organized into enclaves, groups or "shoals" that operate as autonomous or semi-autonomous groups of devices functioning as a collective having a common objective or mission. IoT devices participating in a shoal may be provisioned with shoal-specific context information as part of their device-specific provisioning activity. By way of example, a shoal context object can include a current state variable and a target next state variable. The shoal's target next state variable establishes a goal (e.g., for provisioning activity) without dictating how the individual shoal members (IoT device) are to achieve that goal. This mechanism may be used to drive a shoal's separate devices through their individual provisioning state machines until the shoal itself is made operational.

18 Claims, 3 Drawing Sheets

GOAL-DRIVEN PROVISIONING IN IOT SYSTEMS

TECHNICAL FIELD

Embodiments described herein generally relate to computer network operations. More particularly, embodiments described herein relate to provisioning devices that are organized into self-directed functional groups.

BACKGROUND

The phrase Internet of Things (IoT) refers to physical objects, devices or "things" embedded with electronics, software and the ability to connect to the Internet. The connectivity permits the implementation of systems that monitor and control an activity. By way of example, multiple pumps in a nuclear power plant may be controlled (turned on/off or throttled) based on a number of factors such as the desired power level, coolant temperature, and the operation of other pumps within the coolant loop. Thus, not only can single sensors (e.g., a light sensor) or actuators (e.g., a light switch) be controlled in this way, but collections of sensors and actuators may be designed to function as a unit, where inter-device communication is operationally beneficial or necessary.

The Internet, in contrast, was designed to facilitate host-to-host communication. Within such an environment, traditional approaches to provisioning involve the use of trusted third parties such as manageability services, key management services and access management services. Recent trends in cloud computing have exacerbated this shift toward centralizing many security provisioning services. Centralized services represent a single point of failure for safety critical cyber-physical systems (think pump controllers in a nuclear power plant and health monitoring systems in a hospital). Centralized security provisioning services also imply a trust relationship is required between IoT devices and the central entity. Such centralization of trust represents a fallacious expectation that such an entity can operate without conflicts of interest and without increasing the device's attack surface exposure. Such assumptions may not be appropriate for many IoT systems.

DETAILED DESCRIPTION

This disclosure pertains to systems, methods, and computer readable media to organize and operate IoT devices in a novel and non-obvious manner. In general, techniques are disclosed for provisioning IoT devices in accordance with a state machine model. More particularly, collections of such IoT devices may be organized into enclaves, groups or "shoals" that operate as autonomous or semi-autonomous groups of devices functioning as a collective having a common objective or mission. IoT devices participating in a shoal may be provisioned with shoal-specific context information as part of their device-specific provisioning activity. By way of example, a shoal context object can include a current state variable and a target next state variable. The shoal's target next state variable establishes a goal (e.g., for provisioning activity) without dictating how the individual shoal members (IoT device) are to achieve that goal. This mechanism may be used to drive a shoal's separate devices through their individual provisioning state machines until the shoal itself is made operational.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of IoT device processing systems having the benefit of this disclosure.

Figure 1:
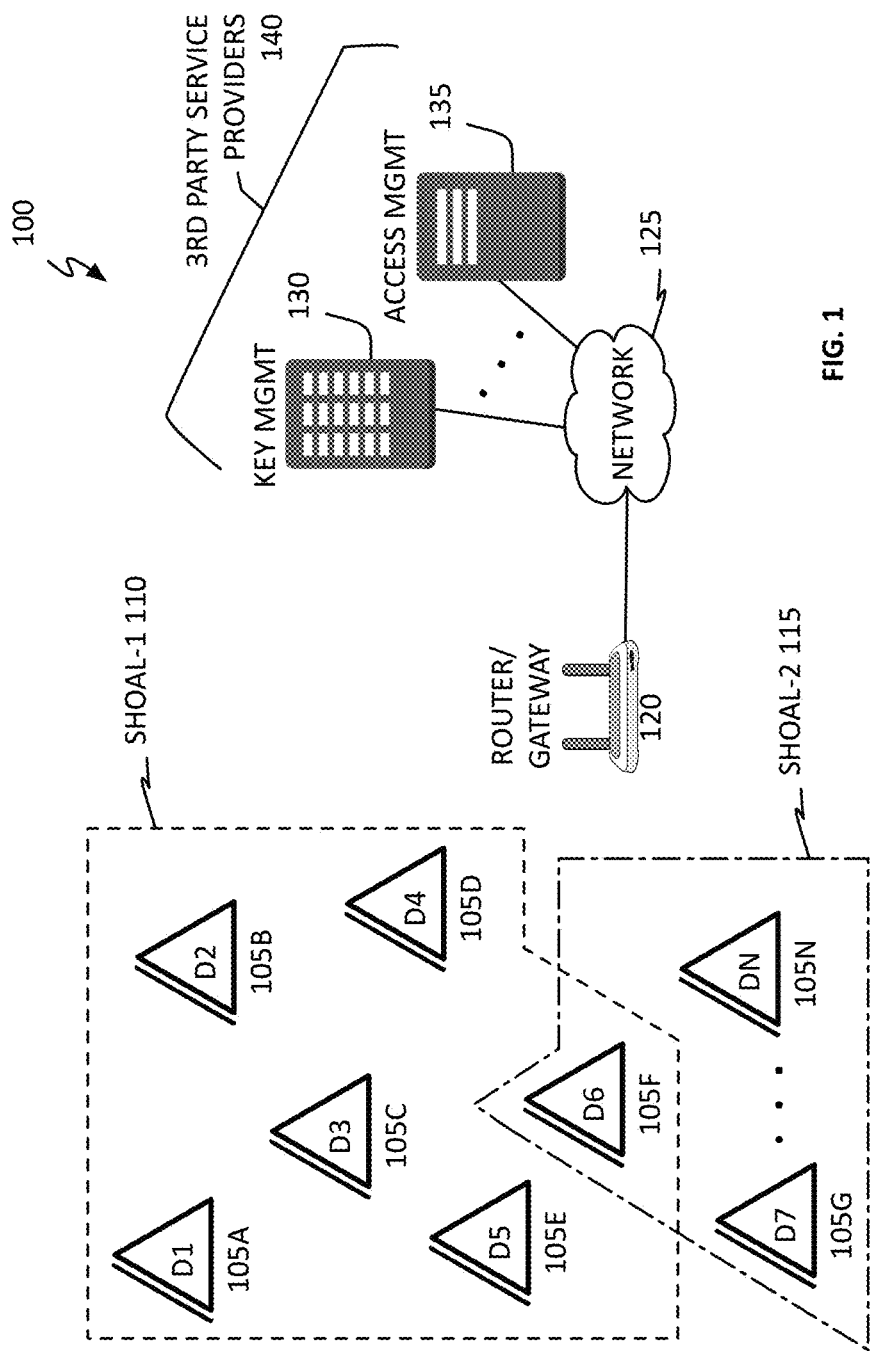
FIG. 1 shows, in block diagram form, an IoT system in accordance with one embodiment.

Referring to FIG. 1, IoT system 100 in accordance with one embodiment includes a number of IoT devices 105A-105F and 105G through 105N grouped into shoal-1 110 and shoal-2 115, router/gateway 120, network 125, key management server 130, access control management server 135 with management servers 130 and 135 identified collectively as third party service providers 140. It should be understood that: each device may be as simple or as complex as its individual function requires; while only a limited number of devices have been shown, each shoal may include as many or as few devices as necessary to perform its designated function (e.g., the control of a series of pumps in a nuclear power plant or a single light); shoal-1 110 has been shown overlapping shoal-2 115 to illustrate that a single device may belong to more than one shoal, and should not be taken as limiting a device to 2 shoals; router/gateway 120 may be as simple or complex as needed (e.g., including both wireless and wired elements); network 125 represents 1 or more separate networks each of which may take any form including, but not limited to, a Local Area Network (LAN) or a Wide Area Network (WAN) such as the Internet, any of which may use any desired technology (wired, wireless or a combination thereof) and communication protocol such as the Transmission Control Protocol (TCP) or the Point-to-Point Protocol (PPP); and third party service provides 140 represent as many or as few service providers as necessary to support devices 105 provisioning operations—further, a single physical device may provide multiple services. Illustrative IoT devices that may benefit from this disclosure include, but are not limited to, wearable devices (e.g., battery powered device), media players (e.g., for music and movies), home or factory automation (devices needing low latency communication for product interoperability), and smart devices (e.g., direct network connection that are tightly coupled to a service).

Figure 2:
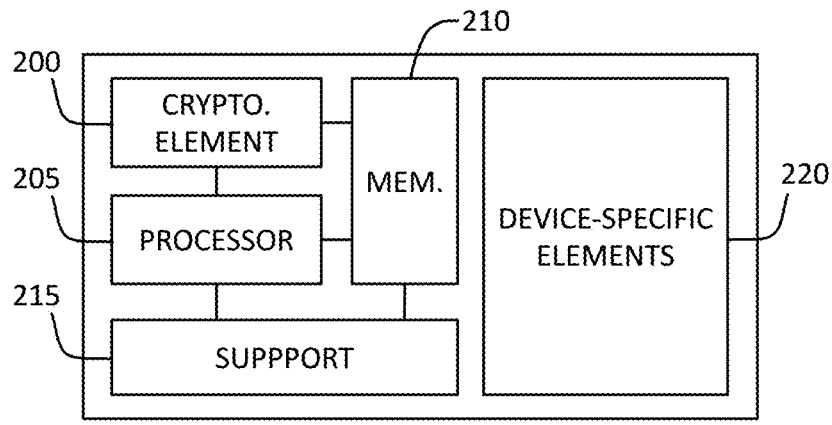
FIG. 2 shows, in block diagram form, an IoT device in accordance with one embodiment.

Referring now to FIG. 2, IoT device 105A in accordance with one embodiment includes cryptographic element 200, processor 205, memory 210, support circuitry or module 215, and device-specific elements 220. Cryptographic element 200 may be implemented in any appropriate fashion and, in one embodiment, may be a single tamper-resistant package that includes all of the necessary cryptographic processing capability necessary for device 105A to join a communications network and operate with other IoT devices within a secure environment. In other embodiments a secure operating environment may not need to be affirmatively established and so cryptographic element 200 may not be necessary (e.g., a shoal may operate in a physically secure environment such as that provided by an isolated network). Processor 205 may be any one or more processing elements (programmable or hardwired) and, in many IoT devices, is often resource constrained (e.g., having limited computational capability, memory, and access to power). Memory 210 may include memory cache, read-only memory (ROM), and/or random access memory (RAM). Support module 215 may include whatever additional components are needed to enable cryptographic element 200, processor 205 and memory 210 to interact with external components (e.g., one or more communication ports) and device-specific elements 220 to fulfill the purpose of the device such as, for example, sensors and/or actuators. IoT device 105A may at time of manufacture, or later, be loaded with the necessary cryptologic keys and certificates and at least one state machine in accordance with this disclosure. In one scenario, cryptologic element 200 may be loaded with a base set of keys and certificates when manufactured, while device 105A (e.g., memory 210) may be loaded by an OEM with one or more state machines.

Figure 3:
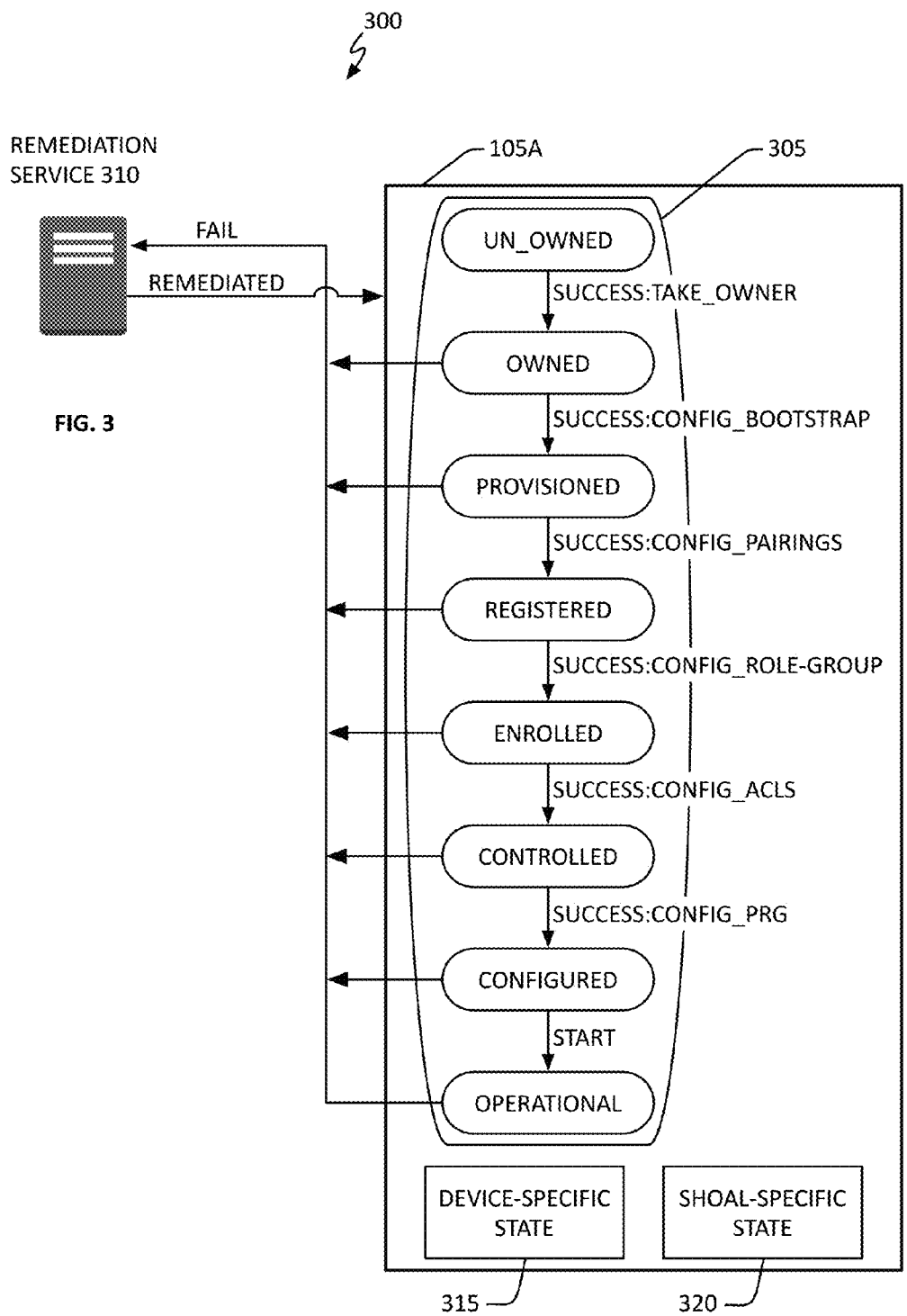
FIG. 3 shows, in block diagram form, an illustrative IoT system in accordance with one embodiment.

Referring to FIG. 3, exemplary IoT system 300 includes IoT device 105A (including illustrative state machine 305) and remediation service 310. It will be understood that when a device is said to "have" or "include" a state machine, it means that some representation of the state machine has been delivered to or incorporated in the device. In one embodiment, the state machine may be represented by firmware programmed in a specified manner. In another embodiment, the state machine may be represented in user-level program code. In yet another embodiment, the state machine may be represented by a combination of firmware and user-level program code. In still another embodiment, the state machine may be represented by a combination of software and hardware. In yet another embodiment, the state machine may be embodied directly in hardware (e.g., via field-programmable gate arrays). Also shown in FIG. 3 are device-specific and shoal-specific state information, 315 and 320 respectively. This information may, for example, be retained in memory 210 (see FIG. 2). Device-specific state information 315 can be that used by conventional IoT devices augmented by any additional state information needed to support the device's state machine such as, for example, a current state variable ('current.dstate') and a target next state variable ('next.dstate'). Shoal-specific state information 320 can include a shoal state object that has at least 2 state variables. One to indicate the shoal's current state ('current.sstate'), and the other to indicate the shoal's target next state ('next.sstate').

Table 1 enumerates the provisioning states that may be entered into during a device's progression from a primitive state (e.g., OWNED) to a fully functional state (e.g., OPERATIONAL) and corresponds to illustrative state machine 305. Table 2 describes the actions taken when transitioning from one state to a next state in state machine 305. The states identified in Table 1 and the actions identified in Table 2 constitute an illustrative state model only. An IoT device's actual state machine in accordance with this disclosure may have more or fewer states than those shown. In addition, the structure of state machine 305 has been made simple for presentational purposes. An actual state machine may be as simple or complex as the device's task requires.

TABLE 1

Example State Machine States

| State | Status |
| --- | --- |
| UN-OWNED | As built or provided by manufacturer. Device may include, for example, a base set of cryptographic keys, a PIN, or physical switch that can be used to place the device in a mode where it is accepting of a "take owner" protocol. |
| OWNED | Control and ownership resides in a entity other than the manufacturer. The new owner can provide or generate a secret (e.g., a symmetric key) as proof that device ownership has been taken by the new owner. The 'secret' may be used to establish a bootstrap service (key, URL) that instructs the device where to go when it needs to be bootstrap provisioned. This may be done so that the owner's pre-shared key (PSK), initially used to provision the bootstrap server, does not need to be frequently used. This, in turn, allows the owner's PSK values to be archived in a safe location. These keys need only be used when the device needs to be wiped clean of all provisioning data, but where retaking ownership is not desired. This step can be done down-the-wire or over-the-air. |
| PROVISIONED | Device is provisioned in accordance with the new owner's designated bootstrap service. |
| REGISTERED | Secure communications has been established between pairs of IoT devices. |
| ENROLLED | Device's role within a shoal established (e.g., administrator, synchronization broker) so that all other shoal devices recognize |

TABLE 1-continued

Example State Machine States

| State | Status |
|---|---|
| | the same. (Provisioning all of the devices in a shoal and creating role privileges that all the devices recognize and can validate may be part of the credential structure on each device.) |
| CONTROLLED | An IoT device can have a set of resources that define its behavior and nature. Resource access, in turn, may be restricted using an access control list (ACL). In this state a device is provisioned with all ACLs it needs to perform its designated function (i.e., so that it may be "controlled"). |
| CONFIGURED | Devices with resources (a server) may be ready to perform some duty, but would not do anything without another device (a client) asking it to do so. Since client devices may be headless (lacking a graphical user-interface) and autonomous, there needs to be a way to tell a server what to do. In this state, all necessary script(s) and/or control logic needed to permit the device (acting as a client) to trigger an action in another device (acting as a server) have been obtained. |
| OPERATIONAL | Device is fully provisioned and ready to begin performing its designated activity as part of a shoal. |

TABLE 2

Example State Machine State Transitions

| State Transition | Action |
|---|---|
| UN-OWNED → OWNED | Device asserts the "take-owner" protocol to shift ownership to a new owner. |
| OWNED → PROVISIONED | Device uses bootstrap key to access the designated bootstrap service to bootstrap provision itself. |
| PROVISIONED → REGISTERED | Pair-wise symmetric keys are created, provisioned and used to establish secure communications between pairs of IoT devices so that they may function as a cohesive unit. Once complete, the devices may be said to be "registered" with one another. |
| REGISTERED → ENROLLED | Device asserts a role within the shoal to other shoal members (e.g., administrator or synchronization broker) so that it may gain access to functionality and resources that require privilege. For example, the ability to broadcast or multi-cast to other devices requires a symmetric key that is shared by all the other devices being communicated with. (Provisioning all of the devices in a shoal and creating role privileges that all the devices recognize and can validate may be part of the credential structure of each device.) |
| ENROLLED → CONTROLLED | During this transition a device's ACL policy and provisioning may be configured (this is what allows a device to be controlled). Devices that don't have any ACLs may default to no-access. Such a policy necessarily needs to allow interaction with a provisioning service that supplies the ACLs. |
| CONTROLLED → CONFIGURED | Device obtains the necessary script(s) and/or control logic that permits it to ask another device (acting as a server) to do some task. This establishes the highest level of configuration without the device actually doing something. |
| CONFIGURED → OPERATIONAL | Device issues or receives a trigger, broadcast, multicast or timer to signal all the shoal's devices that they are to begin executing their programmed task. (Triggering may not need to be a synchronized event, but the state model approach described herein allows this to occur if appropriate.) |

Returning to FIG. 3, if actions in accordance with any given state fail, remediation service 310 may be notified. In the embodiment of FIG. 3, control from remediation server 310 is returned to device 105; the specific state can depend upon which state failed. In one embodiment, control may be returned to the state that failed. In another embodiment, control may be returned to the last successfully traversed state. In still another embodiment, control may be returned to a known/specified error-return state (not shown).

A review of FIG. 3 and Tables 1 and 2 indicate that only the UN_OWNED to OWNED state transition is not self-starting. That is, device 105A must be purposefully "pushed" by an external element to transition from the UN_OWNED state to the OWNED state. By way of example, consider an IoT device that is loaded with cryptographic keys and credentials at time of manufacture but is otherwise unprepared for any activity—e.g., it is in the UN_OWNED state. When given a predetermined "start" signal (not shown), device 105A may use those keys and credentials to set-up a secure channel to the device or component that gave it the "start" signal. Once this is done, device 105A knows its owner but is not otherwise provisioned—e.g., it is in the OWNED state. In practice this may be accomplished using an anonymous identification key (AIK) for which some local service vets. There can then be a challenge/response sequence wherein the server ("owner")

authenticates the client (IoT device) using this key only during the "get acquainted" phase, the public key may be used to encrypt a random number or string that can become a shared secret. There are also network protocols, such as the Extensible Authentication Protocol (EAP), that facilitate this exchange in a simple and efficient manner. One advantage of EAP is that the protocol, in tandem with 802.1x switches, allows this exchange to occur prior to authenticated Dynamic Host Configuration Protocol (DHCP) exchanges (i.e., the device may do this prior to ascertaining its IP address). This does not require a full Public Key Infrastructure (PKI) implementation; it can be a locally-administered infrastructure.

Figure 4:
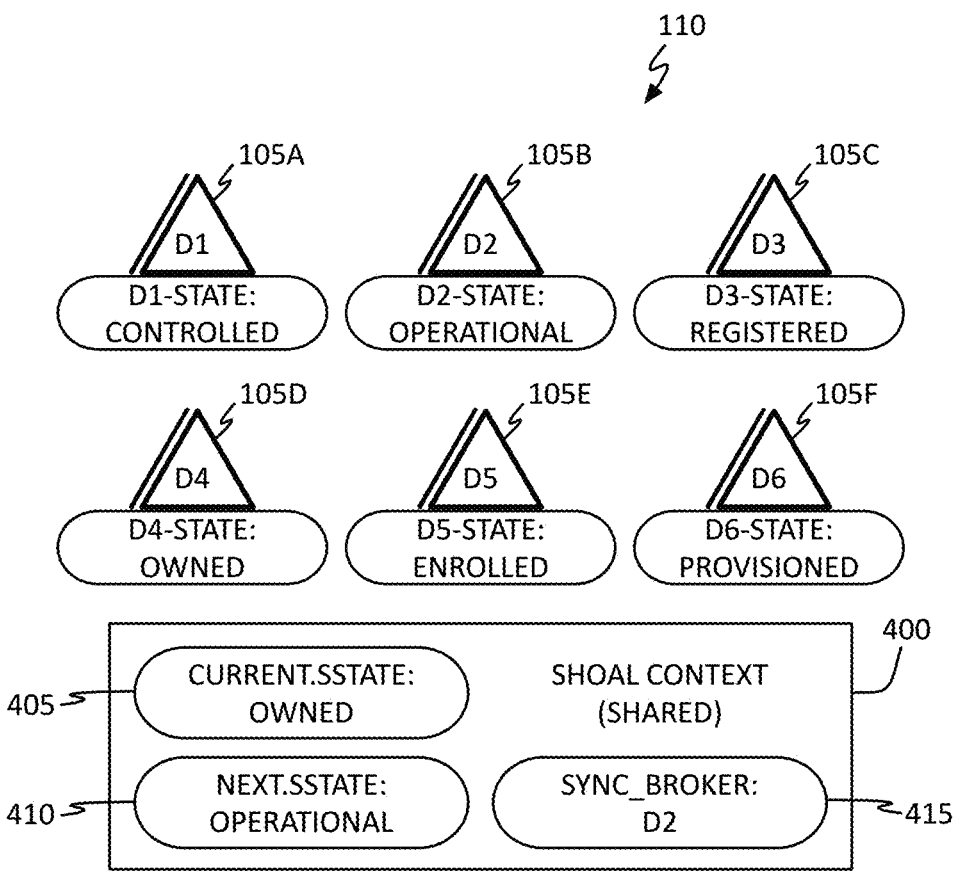
FIG. 4 shows, in block diagram form, an illustrative IoT system in accordance with another embodiment.

Referring to FIG. 4, shoal-1 110 includes IoT devices 105A-E (see FIG. 1) and shoal context 400 which is shared across all shoal devices. The shoal's shared context, in turn, includes the shoal's current state (current.sstate), its target next state (next.sstate) and identification of a synchronization broker (i.e., a device designated to replicate shoal state 400 to other shoal members). Referring to Table 3, example shoal shared context 400 (and 300) illustrates the types of information that may be used it track a shoal's state. In one embodiment, there isn't necessarily a dominant shoal controller, though one or more devices may be nominated as a synchronization broker for replicating shoal context 400 (at a minimum). Additional devices may also be nominated as shoal service entities supporting security, management and access needs. (The creation of role privileges that all of a shoal's devices recognize and can validate may be part of the credential structure on each device.) Shoal devices may also include cloud and enterprise services, but isolation technologies may need to be used to reasonably ensure the cloud hosted entity is prevented from introducing non-shoal devices/controllers into the shoal.

name my be given to a peer shoal or organization network hosting a key distribution service such as Kerberos where the tickets assigned contain the DANE assigned name as the Kerberos 'realm' name.

At the time represented by FIG. 4, each device in shoal-1 110 is in a different state. In one embodiment the shoal's current state 405 may be an amalgamation of the respective shoal device states. A reasonable methodology for determining the shoal's current state is to take the most primitive of the shoal's device's state. Comparing FIG. 4 to FIG. 3 or Table 1, the most primitive device state is "OWNED". The shoal's next state value 410 is designed to drive all devices to the OPERATIONAL state which, in the example of FIG. 3 and Table 1, is the state in which the collective function of the shoal may be manifest. Though each device is at a different provisioning state, this does not necessarily mean the devices are not connected and cannot perform operations. They can perform provisioning operations.

Techniques in accordance with this disclosure empower devices, individually and collectively as part of a shoal, to perform self-directed provisioning actions. Shoal state variables may be maintained locally at each device so that each device may independently function to acquire provisioning from accessible/neighboring devices and services. Shoal state variables (e.g., current.sstate and next.sstate) may be synchronized across each shoal member so each knows its own state and the shoal's state. In one embodiment synchronization may be achieved using a group multi-cast or publish-subscribe relays such as the MQTT (formerly Message Queue Telemetry Transport) and Extensible Messaging and Presence Protocol (XMPP) message brokers. Since the group context state variable is the only object that needs to be shared, it is practical to deploy multiple publish-subscribe (Pub-Sub) brokers within the shoal devices themselves.

TABLE 3

Illustrative Shoal Attributes

| Attribute | Operation | Instances | Required | Description |
|---|---|---|---|---|
| ExternalCred | Read | Multiple | No | Credential used to authenticate asymmetric key pair shared among shoal members. |
| InternalCred | Read/Write | Multiple | No | Credentials used to authenticate shoal members. |
| McastKey | Read/Write | Multiple | No | Data protection key(s) used for shoal disambiguation; intra-shoal communication. [1] |
| Resources | Read/Write | Multiple | No | References to resources shared by shoal members. |
| Exclusive | Read/Write | Multiple | No | Exclusive tag resources for shoal disambiguation. [1] |
| ACLs | Read | Multiple | No | ACL(s) pertaining to shoal resources. |
| Group State | Read/Write | Single | Yes | Identifies the operational status of the shoal. |
| Services | Read/Write | Multiple | No | Support services that assist with maintenance of shoal operations. |
| Owner(s) | Read | Multiple | Yes | Identifies the shoal's authorization resource |

If there are multiple shoals in an environment, each must be disambiguated. Note, the shoal name itself may be assigned by a trusted naming authority such as an Internet Domain Naming Service (DNS) also known as DANE DNS (Domain Name System)-Based Authentication of Named Entities. A system in accordance with this disclosure may accept shoal names from a DANE or other naming authority. The Shoal may embed the trust anchor of a DANE authority as part of the shoal resource (e.g. External Cred). The shoal (Publish-subscribe is a messaging pattern where senders of messages (publishers), do not program the messages to be sent directly to specific receivers (subscribers). Instead, published messages are categorized into classes without knowledge of what, if any, subscribers there may be. Similarly, subscribers express interest in one or more classes, and only receive messages that are of interest without knowledge of what, if any, publishers there are.) Unlike a remediation network where the network directs all provisioning objectives, IoT devices as described herein have no need for a centralized manageability server that must be available whenever a device is in remediation.

Referring to Tables 4 through 6, pseudo-code for a state machine based device provisioning operation in accordance with this disclosure. While not necessarily tied to the illustrative shoal state machine introduced in Tables 1 and 2, this pseudo code does presume that the UNOWNED state resides at one end of the state machine spectrum (e.g., having a value of 0x0000) and OPERATIONAL at the other (e.g., having a value of 0xFFFF). It is believed one of ordinary skill in the art having the benefit of this disclosure will understand that Tables 4-6 capture the operational flow of substantially any state-based device provisioning operation.

TABLE 4

Shoal Control Loop

```
DO {
    CheckPoke( ); /* E.g., set the Shoal's target state to    */
                  /* X, where Shoal.TargetState = X.          */
    Does <Self> Have SyncBroker Capability?
    If YES:
        Nominate <Self> as Sync_Broker
        Set Timer( );
    Else:
        Return;
    /* Determine if poke requires group to change status.     */
    Is Shoal.CurentState == Shoal.TargetState?                */
    If NO: /* Is device's current state aligned with the      */
           /*shoal's target. state?                           */
    {
        For each device D in Shoal {
            /* Device needs to either provision or            */
            /* de-provision something.                        */
            Is D.CurrentState == Shoal.TargetState?
            If NO:
            {
                D.NextState = Shoal.TargetState
                ChangeMyState(D)
            }
            D++;
        }
        Shoal.CurrentState = Shoal.TargetState;
    }
}WHILE (ShoalSync ( ) == 0) /* I.e., while the shoal's        */
                            /* state is not OPERATIONAL.     */
```

TABLE 5

Shoal Synchronization Subroutine

```
Shoal Sync ( ) Subroutine:
{
    /* Wait for synchronization timer to fire. */
    Wait(Timer);
    If Timer cancelled. Then
        Return ERROR.
    For each N = FindNextNeighbor(Self) /* Where 'N' re-   */
        IF N == NULL {                  /* presents a      */
            Return 0;                   /* neighbor device. */
        } ELSE {
            /* Synchronize Self's Shoal resource with its  */
            /* neighbor's Shoal resource */
            N.Shoal = Self.Shoal;
        }
    }
}
```

TABLE 6

Device State Change Subroutine

```
ChangeMyState(Self) Subroutine:
{
    Is Self.CurrentState < Self.NextState?
    If YES:
        Deprovision MySelf to Self.NextState
    Else:
        Provision MySelf to Self.NextState
    Self.CurrentState = Self.NextState;
    /* Add Self to device tally in Shoal.           */
    Shoal[Self].CurrentState = Self.CurrentState;
}
```

One benefit of a state machine based approach to device provisioning is that it can free a system's administrator from micro-managing each device's provisioning operations. In addition, since each device's state machine defines what it may do (but not necessarily how), different devices may perform the same function in different ways—each according to their own operational capabilities. This, in turn, can improve the operational efficiency of a shoal. This same capability permits newer devices to be easily integrated into existing IoT systems (shoals). Other benefits of the disclosed techniques include, but are not limited to: use of a group context structure containing goal-oriented provisioning state variables; use of a group context structure that is defined across shoal members; IoT devices with provisioning state variables; use of Trusted Execution Environment (TEE) protocols to permit the protected execution of a shoal entity; use of one (or more) shoal member devices to assist in the provisioning of a neighbor shoal member device; use of a shoal access control structure/policy to enforce access of shoal member resources by other shoal devices and non-shoal devices; use of an attestation method such as, for example, the Enhanced Privacy ID (EPID) and Sigma key exchange protocols to establish a provisioning channel between one IoT device and a sibling IoT device authorized to share provisioning information;

The following examples pertain to further embodiments.

Global Claims

Example 1 is an Internet of Things (IoT) device, comprising: device hardware configured to function in accordance with a type of device; IoT hardware including: a network communication circuit configured to connect to a network communication medium, memory communicatively coupled to the network communication circuit, and a processor operatively coupled to the device hardware, the network communication circuit and the memory, the memory storing instructions that when executed cause the processor to: employ a provisioning state machine corresponding to the type of device and IoT hardware, wherein the provisioning state machine includes a plurality of states, the final state being an operational state, establish a shoal-specific state information in the memory in accordance with the provisioning state machine, establish an IoT device-specific state information in the memory in accordance with the provisioning state machine, establish communication through the network communication circuit with one or more additional IoT devices, wherein the IoT device and each of the one or more additional IoT devices belong to a shoal of IoT devices, determine, based on the established communication, a state of the shoal and record same in the shoal-specific state information, determine a state of the IoT device and record same in the IoT device-specific state information, and sequence through the plurality of states based on a combination of the shoal state and the IoT device state until the IoT device and the one or more additional IoT devices are in the operational state, wherein updated shoal state is received from at least one of the one or more additional IoT devices through the network communication circuit and recorded in the shoal-specific state information.

In Example 2, the subject matter of Example 1 can optionally include wherein the type of device comprises a pump controller.

In Example 3, the subject matter of Example 1 can optionally include wherein the network communication medium comprises a wireless network communication medium.

In Example 4, the subject matter of any one of Examples 1-3 can optionally include wherein the IoT hardware further includes a cryptographic element communicatively coupled to the processor.

In Example 5, the subject matter of Example 4 can optionally include further comprising instructions stored in the memory that, when executed, cause the processor to use the cryptographic element to establish secure communication with the one or more additional IoT devices.

In Example 6, the subject matter of any one of Examples 1-3 can optionally include wherein the instructions to cause the processor to sequence through the plurality of states comprise instructions to cause the processor to use a mismatch between the shoal state and the IoT device state to initiate action to move to a new state in accordance with the provisioning state machine.

In Example 7, the subject matter of any one of Examples 1-3 can optionally include wherein each state in the provisioning state machine has actions associated with provisioning the IoT device.

Example 8 is an Internet of Things (IoT) operational method, comprising: loading an IoT device with a provisioning state machine control software, wherein the provisioning state machine control software corresponds to the type of IoT device and includes a plurality of states, the final state being an operational state; establishing a shoal-specific state information and a device-specific state information in a memory of the IoT device in accordance with the provisioning state machine; establishing communication through a network communication circuit of the IoT device with one or more additional IoT devices, wherein the IoT device and each of the one or more additional IoT devices belong to a shoal of IoT devices; determining, based on the established communication, a state of the shoal and recording the same in the shoal-specific state information; determining a state of the IoT device and recording the same in the IoT device-specific state information; and sequencing through the plurality of states based on a combination of the shoal state and the IoT device state until the IoT device and the one or more additional IoT devices are in the operational state, wherein updated shoal state is received from at least one of the one or more additional IoT devices through the network communication circuit and recorded in the shoal-specific state information.

In Example 9, the subject matter of Example 8 can optionally include wherein the type of device comprises a health monitoring system device.

In Example 10, the subject matter of Example 8 can optionally include wherein the network communication medium comprises a wireless network communication medium.

In Example 11, the subject matter of any one of Examples 8-10 can optionally include further comprising using a cryptographic element of the IoT device to establish secure communication with at least one of the one or more additional IoT devices.

In Example 12, the subject matter of any one of Examples 8-10 can optionally include wherein sequencing through the plurality of states comprises using a mismatch between the shoal state and the IoT device state to initiate action to move to a new state in accordance with the provisioning state machine.

In Example 13, the subject matter of any one of Examples 8-10 can optionally include wherein each state in the provisioning state machine has actions associated with provisioning the IoT device.

Example 14 is a program storage device comprising instructions stored thereon to cause one or more processors in an Internet of Things (IoT) device to: activate a provisioning state machine corresponding to the IoT device's type, wherein the provisioning state machine includes a plurality of states, the final state being an operational state; establish a shoal-specific state information in a memory of the IoT device in accordance with the provisioning state machine; establish an IoT device-specific state information in the memory in accordance with the provisioning state machine; establish communication through a network communication circuit with one or more additional IoT devices, wherein the IoT device and each of the one or more additional IoT devices belong to a shoal of IoT devices; determine, based on the established communication, a state of the shoal and record the same in the shoal-specific state information; determine a state of the IoT device and record the same in the IoT device-specific state information; and sequence through the plurality of states based on a combination of the shoal state and the IoT device state until the IoT device is in the operational state, wherein updated shoal state is received from at least one of the one or more additional IoT devices through the network communication circuit and recorded in the shoal-specific state information.

In Example 15, the subject matter of Example 14 can optionally include wherein the instructions to establish communication through a network communication circuit comprise instructions to establish communication through a wireless network communication circuit.

In Example 16, the subject matter of any one of Examples 14-15 can optionally include wherein the instructions to establish communication through a network communication circuit comprise instructions to establish secure communication through a network communication circuit using a cryptographic element of the IoT device.

In Example 17, the subject matter of any one of Examples 14-15 can optionally include wherein the instructions to cause the processor to sequence through the plurality of states comprise instructions to cause the processor to use a mismatch between the shoal state and the IoT device state to initiate action to move to a new state in accordance with the provisioning state machine.

In Example 18, the subject matter of Example 14 can optionally include wherein each state in the provisioning state machine has actions associated with provisioning the IoT device.

Example 19 is an Internet of Things (IoT) device, comprising: a processor; a memory operatively coupled to the processor, the memory storing instructions that when executed cause the processor to: activate a provisioning state machine corresponding to the IoT device's type, wherein the provisioning state machine includes a plurality of states, the final state being an operational state; establish a shoal-specific state information in a memory of the IoT device in accordance with the provisioning state machine; establish an IoT device-specific state information in the memory in accordance with the provisioning state machine; establish communication through a network communication circuit with one or more additional IoT devices, wherein the IoT device and each of the one or more additional IoT devices belong to a shoal of IoT devices; determine, based on the established communication, a state of the shoal and record the same in the shoal-specific state information; determine a state of the IoT device and record the same in the IoT device-specific state information; and sequence through the plurality of states based on a combination of the shoal state and the IoT device state until the IoT device is in the operational state, wherein updated shoal state is received from at least one of the one or more additional IoT devices through the network communication circuit and recorded in the shoal-specific state information.

In Example 20, the subject matter of Example 19 can optionally include wherein the instructions to establish communication through a network communication circuit comprise instructions to establish communication through a wireless network communication circuit.

In Example 21, the subject matter of any one of Examples 19-20 can optionally include wherein the instructions to establish communication through a network communication circuit comprise instructions to establish secure communication through a network communication circuit using a cryptographic element of the IoT device.

In Example 22, the subject matter of any one of Examples 19-20 can optionally include wherein the instructions to cause the processor to sequence through the plurality of states comprise instructions to cause the processor to use a mismatch between the shoal state and the IoT device state to initiate action to move to a new state in accordance with the provisioning state machine.

In Example 23, the subject matter of Example 19 can optionally include wherein each state in the provisioning state machine has actions associated with provisioning the IoT device.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, the above description has assumed the existence of a secure communication environment within which each shoal member operates. This is not strictly required. That is, each shoal member may share credentials with only some (but not all) other shoal members. Further, each shoal may have multiple synchronization members. In one embodiment (such as that described above), a single shoal member may act as the synchronization broker for an entire shoal. In another embodiment, a different synchronization broker may be used for each shoal/group attribute (e.g., calculate shoal state, keep group membership, and credential management). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. An Internet of Things (IoT) device, comprising:
device hardware configured to function in accordance with a type of device; IoT hardware including:
a network communication circuit configured to connect to a network communication medium,
memory communicatively coupled to the network communication circuit, and
a processor operatively coupled to the device hardware, the network communication circuit and the memory, the memory storing instructions that when executed cause the processor to:
employ a provisioning state machine corresponding to the type of device and IoT hardware, wherein the provisioning state machine includes a plurality of states, the final state being an operational state,
establish a shoal-specific state information in the memory in accordance with the provisioning state machine,
establish an IoT device-specific state information in the memory in accordance with the provisioning state machine,
establish communication through the network communication circuit with one or more additional IoT devices, wherein the IoT device and each of the one or more additional IoT devices belong to a shoal of IoT devices,
determine, based on the established communication, a state of the shoal and record same in the shoal-specific state information,
determine a state of the IoT device and record same in the IoT device-specific state information, and
sequence through the plurality of states based on a combination of the shoal state and the IoT device state until the IoT device and the one or more additional IoT devices are in the operational state, wherein updated shoal state is received from at least one of the one or more additional IoT devices through the network communication circuit and recorded in the shoal-specific state information.

2. The Internet of Things (IoT) device in accordance with claim 1, wherein the type of device comprises a pump controller.

3. The Internet of Things (IoT) device in accordance with claim 1, wherein the network communication medium comprises a wireless network communication medium.

4. The Internet of Things (IoT) device in accordance with claim 1, wherein the IoT hardware further includes a cryptographic element communicatively coupled to the processor.

5. The Internet of Things (IoT) device in accordance with claim 4, further comprising instructions stored in the memory that, when executed, cause the processor to use the cryptographic element to establish secure communication with the one or more additional IoT devices.

6. The Internet of Things (IoT) device in accordance with claim 1, wherein the instructions to cause the processor to sequence through the plurality of states comprise instructions to cause the processor to use a mismatch between the shoal state and the IoT device state to initiate action to move to a new state in accordance with the provisioning state machine.

7. The Internet of Things (IoT) device in accordance with claim 1, wherein each state in the provisioning state machine has actions associated with provisioning the IoT device.

8. An Internet of Things (IoT) operational method, comprising:
  loading an IoT device with a provisioning state machine control software, wherein the provisioning state machine control software corresponds to the type of IoT device and includes a plurality of states, the final state being an operational state;
  establishing a shoal-specific state information and a device-specific state information in a memory of the IoT device in accordance with the provisioning state machine;
  establishing communication through a network communication circuit of the IoT device with one or more additional IoT devices, wherein the IoT device and each of the one or more additional IoT devices belong to a shoal of IoT devices;
  determining, based on the established communication, a state of the shoal and recording the same in the shoal-specific state information;
  determining a state of the IoT device and recording the same in the IoT device-specific state information; and
  sequencing through the plurality of states based on a combination of the shoal state and the IoT device state until the IoT device and the one or more additional IoT devices are in the operational state, wherein updated shoal state is received from at least one of the one or more additional IoT devices through the network communication circuit and recorded in the shoal-specific state information.

9. The Internet of Things (IoT) operational method in accordance with claim 8, wherein the type of device comprises a health monitoring system device.

10. The Internet of Things (IoT) operational method in accordance with claim 8, wherein the network communication medium comprises a wireless network communication medium.

11. The Internet of Things (IoT) operational method in accordance with claim 8 further comprising using a cryptographic element of the IoT device to establish secure communication with at least one of the one or more additional IoT devices.

12. The Internet of Things (IoT) operational method in accordance with claim 8, wherein sequencing through the plurality of states comprises using a mismatch between the shoal state and the IoT device state to initiate action to move to a new state in accordance with the provisioning state machine.

13. The Internet of Things (IoT) operational method in accordance with claim 8, wherein each state in the provisioning state machine has actions associated with provisioning the IoT device.

14. A program storage device comprising instructions stored thereon to cause one or more processors in an Internet of Things (IoT) device to:
  activate a provisioning state machine corresponding to the IoT device's type, wherein the provisioning state machine includes a plurality of states, the final state being an operational state;
  establish a shoal-specific state information in a memory of the IoT device in accordance with the provisioning state machine;
  establish an IoT device-specific state information in the memory in accordance with the provisioning state machine;
  establish communication through a network communication circuit with one or more additional IoT devices, wherein the IoT device and each of the one or more additional IoT devices belong to a shoal of IoT devices;
  determine, based on the established communication, a state of the shoal and record the same in the shoal-specific state information;
  determine a state of the IoT device and record the same in the IoT device-specific state information; and
  sequence through the plurality of states based on a combination of the shoal state and the IoT device state until the IoT device is in the operational state, wherein updated shoal state is received from at least one of the one or more additional IoT devices through the network communication circuit and recorded in the shoal-specific state information.

15. The program storage device in accordance with claim 14, wherein the instructions to establish communication through a network communication circuit comprise instructions to establish communication through a wireless network communication circuit.

16. The program storage device in accordance with claim 14, wherein the instructions to establish communication through a network communication circuit comprise instructions to establish secure communication through a network communication circuit using a cryptographic element of the IoT device.

17. The program storage device in accordance with claim 14, wherein the instructions to cause the processor to sequence through the plurality of states comprise instructions to cause the processor to use a mismatch between the shoal state and the IoT device state to initiate action to move to a new state in accordance with the provisioning state machine.

18. The program storage device in accordance with claim 14, wherein each state in the provisioning state machine has actions associated with provisioning the IoT device.

* * * * *